United States Patent
Kramer

(10) Patent No.: US 6,737,815 B2
(45) Date of Patent: May 18, 2004

(54) REDUCING VERTICAL SEGREGATION IN A HID LAMP OPERATED AT VHF FREQUENCIES USING SIMULTANEOUS ARC STRAIGHTENING AND COLOR MIXING

(75) Inventor: Jerry Martin Kramer, Yorktown Height, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/023,694

(22) Filed: Dec. 21, 2001

(65) Prior Publication Data

US 2003/0117085 A1 Jun. 26, 2003

(51) Int. Cl.[7] .................... H05B 37/00; H05B 41/16; G05F 7/00
(52) U.S. Cl. .................. 315/246; 315/291; 315/194
(58) Field of Search ................ 315/246, 291, 315/248, 194, 219, 307, 224, 209 R, 308, 174, 326, DIG. 7, DIG. 5

(56) References Cited

U.S. PATENT DOCUMENTS

| | | | | |
|---|---|---|---|---|
| 5,121,034 A | * | 6/1992 | Allen et al. ................ 315/246 |
| 5,306,987 A | * | 4/1994 | Dakin et al. ............... 315/248 |
| 5,436,533 A | * | 7/1995 | Fromm et al. ............. 315/246 |
| 5,684,367 A | * | 11/1997 | Moskowitz et al. ........ 315/246 |
| 5,773,937 A | * | 6/1998 | Miyazaki et al. .......... 315/246 |
| 5,880,561 A | * | 3/1999 | Miyazaki et al. ....... 315/209 R |
| 5,952,794 A | * | 9/1999 | Bergman et al. .......... 315/307 |
| 6,184,633 B1 | | 2/2001 | Kramer .................... 315/246 |
| 6,300,729 B1 | | 10/2001 | Keijser et al. ............. 315/325 |
| 2002/0041165 A1 | * | 4/2002 | Cammack ................. 315/291 |

FOREIGN PATENT DOCUMENTS

| | | |
|---|---|---|
| EP | 1 058 288 | 12/2000 |
| WO | WO 00/45419 | 8/2000 |

* cited by examiner

*Primary Examiner*—Don Wong
*Assistant Examiner*—Chuc Tran
(74) *Attorney, Agent, or Firm*—Ernestine C. Bartlett

(57) ABSTRACT

A method and structure for substantially overcome vertical segregation in HID lamps, the method comprising the steps of: determining and selecting a frequency sweep signal to produce arc straightening and a fixed frequency signal for exciting a second longitudinal acoustic mode; and exciting in conjunction with a carrier frequency an arc straightening acoustic mode together with a second longitudinal acoustic mode excitation. In a preferred embodiment, the exciting step comprises amplitude modulating the carrier frequency signal with a sum of the frequency sweep signal and the fixed frequency signal.

29 Claims, 5 Drawing Sheets

REDUCING VERTICAL SEGREGATION IN A HID LAMP OPERATED AT VHF FREQUENCIES USING SIMULTANEOUS ARC STRAIGHTENING AND COLOR MIXING

FIELD OF THE INVENTION

The present invention relates generally to the field of high intensity discharge lamps, and more particularly to aspects related to overcoming vertical segregation in such lamps.

BACKGROUND OF THE INVENTION

It has been shown previously that the vertical segregation present in long and thin cylindrical ceramic metal halide discharge lamps can be overcome by exciting the $2^{nd}$ longitudinal acoustic mode of the lamp. In this regard, see U.S. Pat. No. 6,184,633. As an example, a 70 W ceramic HID lamp with dimensions of 4 mm ID and 19 mm IL was operated with a current frequency sweep from about 45 to 55 kHz with a 10 ms period. This 10 kHz frequency sweep is above the $1^{st}$ azimuthal acoustic mode of the lamp and below the $1^{st}$ radial acoustic mode of the lamp. In addition to operating the lamp in a stable manner this frequency range has the important benefit of straightening the arc when operated horizontally. The $2^{nd}$ longitudinal acoustic mode was excited by amplitude modulating the 45 to 55 kHz frequency sweep at the power frequency corresponding to the $2^{nd}$ longitudinal acoustic mode. The voltage (or current) waveform is $\cos(2\pi\Delta f_1 t)*[1+m_3 \cos(2\pi f_3 t)]$ where $\Delta f_1$ is the 45 to 55 kHz frequency sweep, $f_3$ is the amplitude modulating frequency (~24 kHz in this example) and $m_3$ is the modulation index (<1). The voltage (or current) spectrum is a frequency sweep from 45 to 55 kHz with two sidebands 10 kHz wide centered at $+/-f_3$ (i.e. 26 and 74 kHz). This produces a power spectrum with frequency components at $2\Delta f_1$, $2\Delta f_1 +/- f_3$, and $f_3$ It is the power frequency at $f_3$ that excites the $2^{nd}$ longitudinal acoustic mode. (Acoustic resonances are driven by a periodic power input. For sinusoidal type waveforms, the power frequency that excites an acoustic resonance is at twice the current frequency.)

The frequency of the $2^{nd}$ longitudinal acoustic mode can vary by a few kHz from lamp to lamp because of small differences in mercury pressure, dimensions, chemistry, etc. The best frequency for color mixing can be found by probing frequencies around the expected frequency of the $2^{nd}$ longitudinal acoustic mode and measuring the lamp voltage. At the frequency that gives good color mixing, the lamp voltage will be a maximum. An algorithm to find the $2^{nd}$ longitudinal acoustic mode based on lamp voltage has been developed and is disclosed in U.S. Pat. No. 6,400,100, which disclosure is hereby incorporated by reference in its entirety.

A principal problem with configurations designed to excite the second longitudinal acoustic mode is the necessity for a relatively complex ballast.

SUMMARY OF THE INVENTION

Briefly, the present invention comprises, in one embodiment, a method to substantially overcome vertical segregation in HID lamps, comprising the steps of: determining and selecting a frequency sweep signal to produce arc straightening and a fixed frequency signal for exciting a second longitudinal acoustic mode; and exciting in conjunction with a carrier frequency an arc straightening acoustic mode together with a second longitudinal acoustic mode excitation.

In a further aspect of this embodiment, the frequency that produces arc straightening is in a range above a first azimuthal acoustic mode and below a first radial acoustic mode for the resonance spectrum of the HID lamp In a further aspect of this embodiment, the step is provided of choosing the carrier frequency signal sufficiently high in frequency so that in conjunction with the frequency sweep signal the arc is stable and color mixing is achieved.

In a further aspect of this embodiment, the exciting step comprises amplitude modulating the carrier frequency signal with a sum of the frequency sweep signal and the fixed frequency signal.

In a further aspect of this embodiment, the step is provided of controlling an amount of arc straightening by controlling an amplitude of the amplitude modulating frequency sweep signal.

In a further aspect of this embodiment, the step is provided of controlling an amount of color mixing by controlling an amplitude of the fixed frequency signal.

In a further aspect of this embodiment, the exciting step comprises the step of summing the carrier frequency signal with the frequency sweep signal and the fixed frequency signal to obtain difference power frequencies which excite the arc straightening acoustic mode and the second longitudinal acoustic mode.

In a further aspect of this embodiment, the exciting step comprises the step of alternating in time continuously the carrier frequency signal, the frequency sweep signal and the fixed frequency signal, in any order, with both the frequency sweep signal and the fixed frequency signal being at one half the power frequencies required for arc straightening and color mixing, respectively.

In a further aspect of this embodiment, the step is provided of controlling an amount of arc straightening by controlling a duration of the frequency sweep signal relative to the duration of the carrier frequency signal.

In a further aspect of this embodiment, the step is provided of controlling an amount of color mixing by controlling a duration of the fixed frequency signal relative to the duration of the carrier frequency signal.

In a further aspect of this embodiment, the determining step comprises: determining a resonance spectrum for the HID lamp; selecting a frequency range for the frequency sweep signal to produce arc straightening that is above the first azimuthal acoustic mode for the HID lamp and below the first radial acoustic mode for the HID lamp and selecting a frequency for the fixed frequency signal to produce color mixing.

In a further aspect of this embodiment, the HID lamp has a cylindrical symmetry.

In a further aspect of this embodiment, the HID lamp has a discharge vessel with a ceramic wall.

In another embodiment of the present invention, an HID lamp with arc straightening is provided, comprising: a discharge vessel containing an ionizable filling; and a circuit for exciting in conjunction with a carrier frequency an arc straightening acoustic mode together with a second longitudinal acoustic mode in the discharge vessel.

In a further aspect of this embodiment, the exciting circuit comprises: a first component for generating a frequency sweep signal to produce arc straightening and a fixed frequency signal for exciting a second longitudinal acoustic mode and summing the frequency sweep signal and the fixed frequency signal; and a second component for combining the summed frequency sweep signal and the fixed frequency signal with a carrier frequency signal to excite the arc straightening acoustic mode together with the second longitudinal acoustic mode in the discharge vessel In a further aspect of this embodiment, the second component provides a carrier frequency signal sufficiently high in frequency so that in conjunction with the frequency sweep signal the arc is stable and color mixing is achieved.

In a further aspect of this embodiment, the second component for combining amplitude modulates the carrier frequency signal with the sum of the frequency sweep signal and the fixed frequency signal.

In a further aspect of this embodiment, the second component for combining sums the carrier frequency signal with the frequency sweep signal and the fixed frequency signal to obtain difference power frequencies which excite the arc straightening acoustic mode and the second longitudinal acoustic mode.

In a further aspect of this embodiment, the second component for combining alternates in time continuously the carrier frequency signal, the frequency sweep signal and the fixed frequency signal, in any order, with both the frequency sweep signal and the fixed frequency signal being at one half the power frequencies required for arc straightening and color mixing, respectively.

DETAILED DESCRIPTION OF THE PREFERRED EMBODIMENT

Operating lamps at very high frequencies (VHF), where the acoustic modes are damped, offers advantages for the ballast. At VHF frequencies the ballast can be smaller and less expensive compared to a typical low frequency (<1000 Hz) ballast. Unfortunately, any deficiencies in the operating performance of the lamp will still be present at VHF frequencies. For example in long and thin lamps operated vertically, segregation of the metal halide components will be present, leading either to very different color temperatures in different spatial orientations or to decreased efficacy in vertical compared to horizontal.

A method has been discovered to substantially overcome vertical segregation in long and thin HID lamps using a carrier frequency. The method to substantially overcome vertical segregation in HID lamps comprises the steps of: determining and selecting a frequency sweep for producing arc straightening and a fixed frequency for exciting a second longitudinal acoustic mode; and exciting in conjunction with a carrier frequency an arc straightening acoustic mode together with a second longitudinal acoustic mode.

Figure 1:
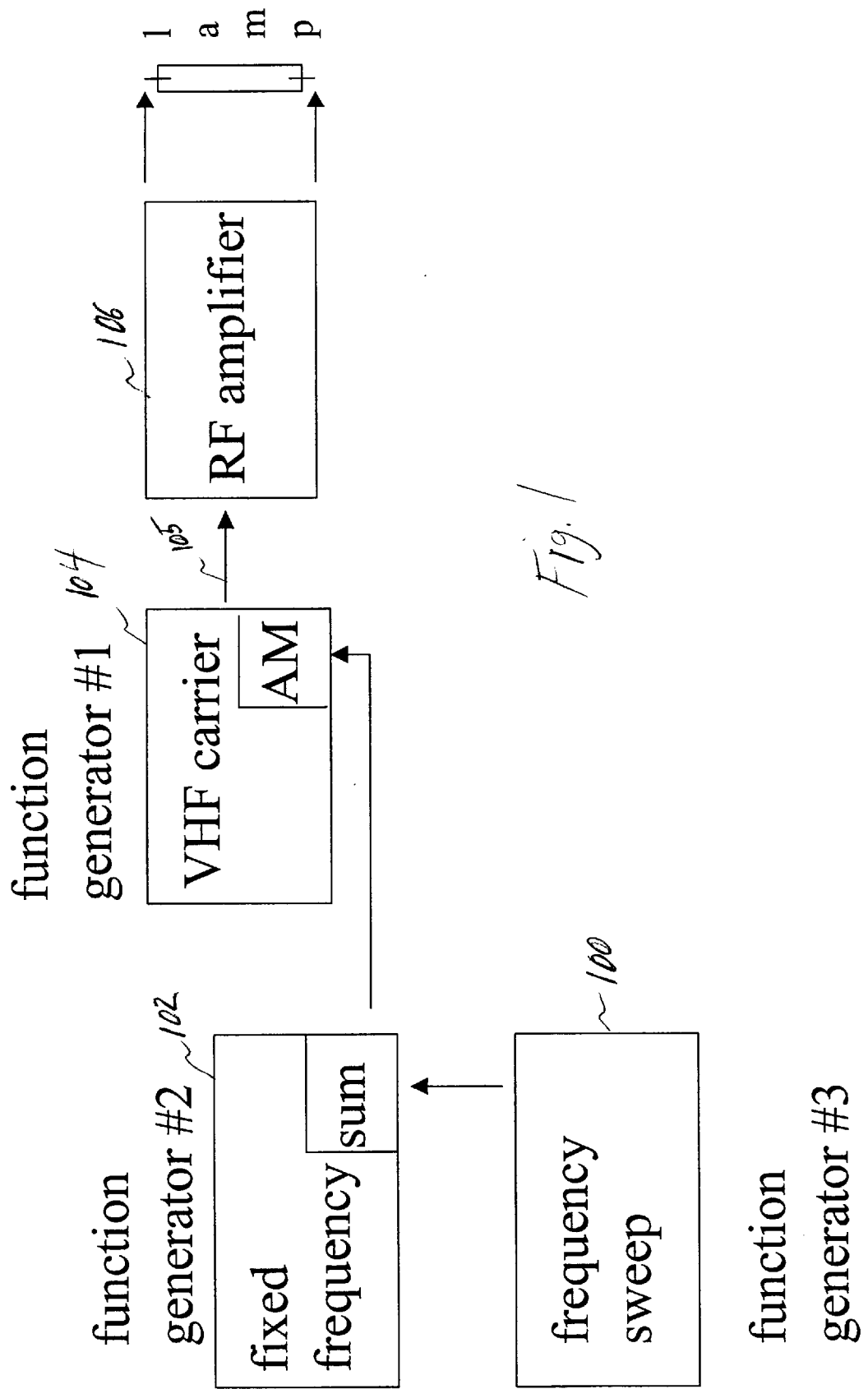
FIG. 1 is a schematic block diagram of one embodiment of the frequency generation for the present invention.
Figure 2:
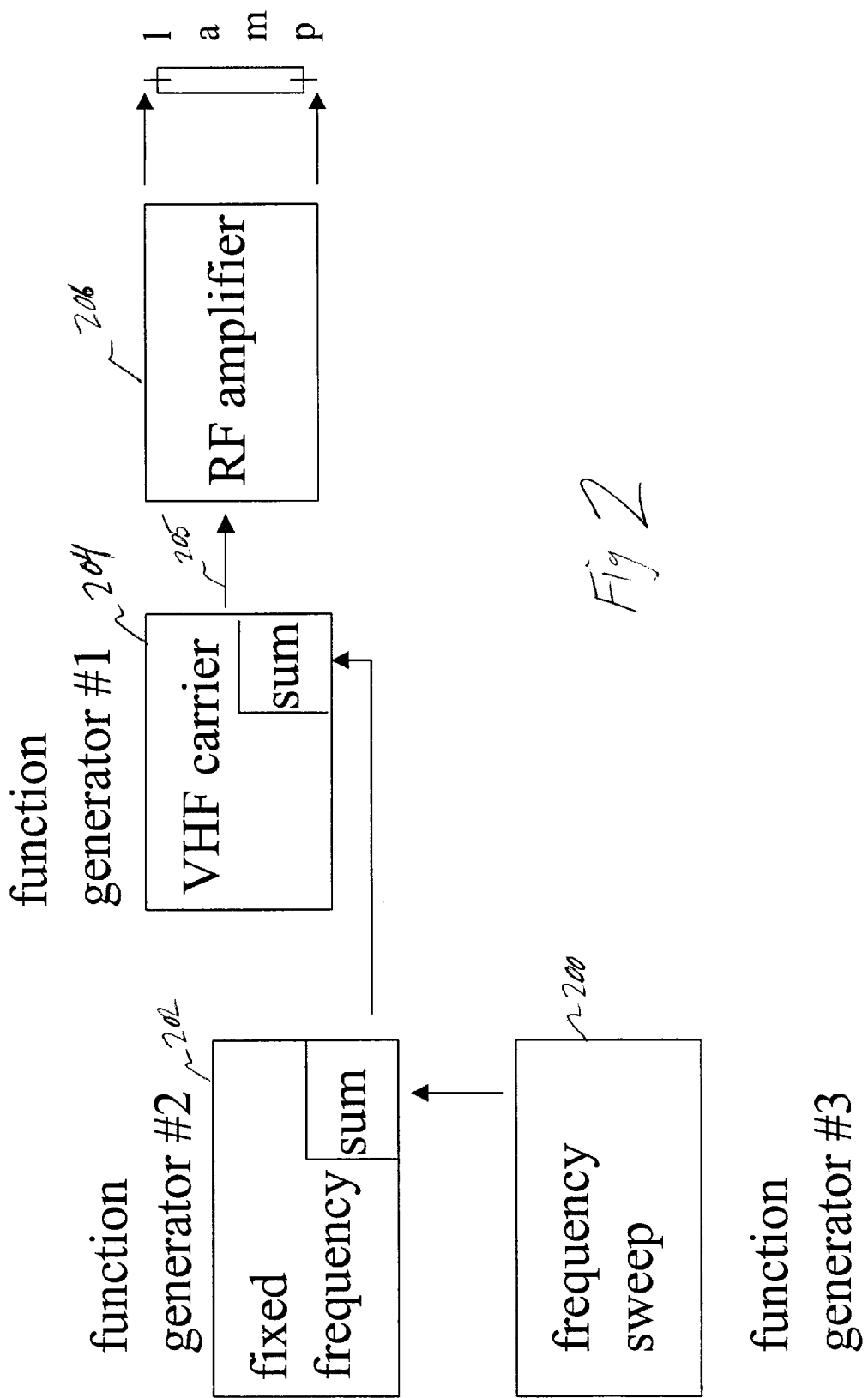
FIG. 2 is a schematic block diagram of a second embodiment of the frequency generation for the present invention.

A configuration for providing the arc straightening frequency sweep and the fixed frequency in conjunction with the carrier frequency is shown in FIGS. 1 and 2. In FIGS. 1 and 2 a function generator (100, 200) generates a frequency sweep. This frequency sweep is then provided to the sum input for a function generator (102, 202) which provides a fixed frequency. The resulting summed signal is then provided to a function generator (104 and 204) that generates the carrier frequency. The function generator (104, 204) performs a mathematical operation on the incoming sum frequencies and provides an output (105, 205) to an RF amplifier (106, 206) for application to the electrodes of an HID lamp which will excite an acoustic mode for arc straightening and the second longitudinal acoustic mode to substantially overcome vertical segregation. The mathematical operation can take a variety of forms. In a preferred embodiment shown in FIG. 1, the carrier frequency is amplitude modulated with the sum of the frequency sweep for producing arc straightening and the fixed frequency for exciting the second longitudinal acoustic mode. In an alternative embodiment shown in FIG. 2, the mathematical operation may comprise determining a sum of the carrier frequency and the frequency sweep and the fixed frequency, and using difference power frequencies to excite acoustic modes to achieve a substantial reduction in vertical segregation and also to achieve substantial arc straightening. Alternatively, the mathematical operation could comprise alternating in time continuously the carrier frequency, the frequency sweep for producing arc straightening, and the fixed frequency for exciting the second longitudinal acoustic mode. In this embodiment the frequency sweep and the fixed frequency are equal to one half the power frequencies required for arc straightening and excitation of the $2^{nd}$ longitudinal acoustic mode, respectively.

It should be noted that the important aspects of the present invention relate to the way the different frequency signals are combined. The specific hardware illustrated in the drawings is for ease of explanation only. A variety of other methods for combining the frequency signals would be evident to one of ordinary skill in the art. Thus, the invention is in no way limited to one particular hardware configuration.

Figure 3:
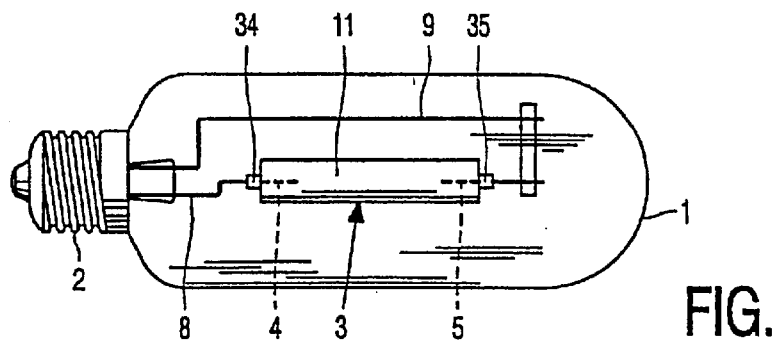
FIG. 3 is a schematic diagram of an HID lamp that may be used to implement an embodiment of the present invention.

Before going into more detail on the exciting of an arc straightening acoustic mode in conjunction with a carrier frequency, details will be provided for one embodiment of an HID lamp that may be implemented with the present invention. Referring now to FIG. 3, a metal halide lamp is shown comprising a discharge vessel 3, with details of the discharge vessel 3 shown in a cross-section and not to scale in FIG. 4. The discharge vessel 3 is shown to include a ceramic wall enclosing a discharge space 11 which contains an ionizable filling in the lamp. In a preferred embodiment, the ionizable filling includes Hg and a quantity of metal halide chemistries. The metal halide chemistry typically includes one or more of Na halides, Tl, Dy and Ce halides. Two electrodes 4, 5 with electrode bars 4a, 5a and tips 4b, 5b are arranged in the discharge space with a distance EA therebetween, in the drawing. The discharge vessel has an internal diameter Di at least through the distance EA. The discharge vessel is sealed at the ends by ceramic projecting plugs 34, 35 which tightly encloses a current feedthrough conductor 40, 41 and 50, 51 which connect to the electrodes 4, 5 arranged in the discharge vessel in a gastight manner by means of a melt-ceramic compound 10 near one end remote from the discharge space. The discharge vessel 3 is enclosed by an outer envelope 1 provided at one end with a lamp cap 2. In the operational state of the lamp, a discharge extends between the electrodes 4, 5. Electrode 4 is connected via a current conductor 8 to a first electric contact which forms part of the lamp cap 2. Electrode 5 is connected via a current conductor 9 to a second electric contact which forms part of the lamp cap 2. The metal halide lamp shown is intended to be operated with an electronic ballast, as described in more detail in U.S. Pat. No. 6,300,729, which is hereby incorporated by reference, or a magnetic ballast, or other convenient ballast. Note that the above-described configuration for the HID lamp is provided for purposes of explaining the invention, but the invention is in no way limited to this configuration.

Note that the chemistries for the ionizable filling may be implemented in a variety of formulations. The present invention is not limited the formulations disclosed in the examples.

Figure 4:
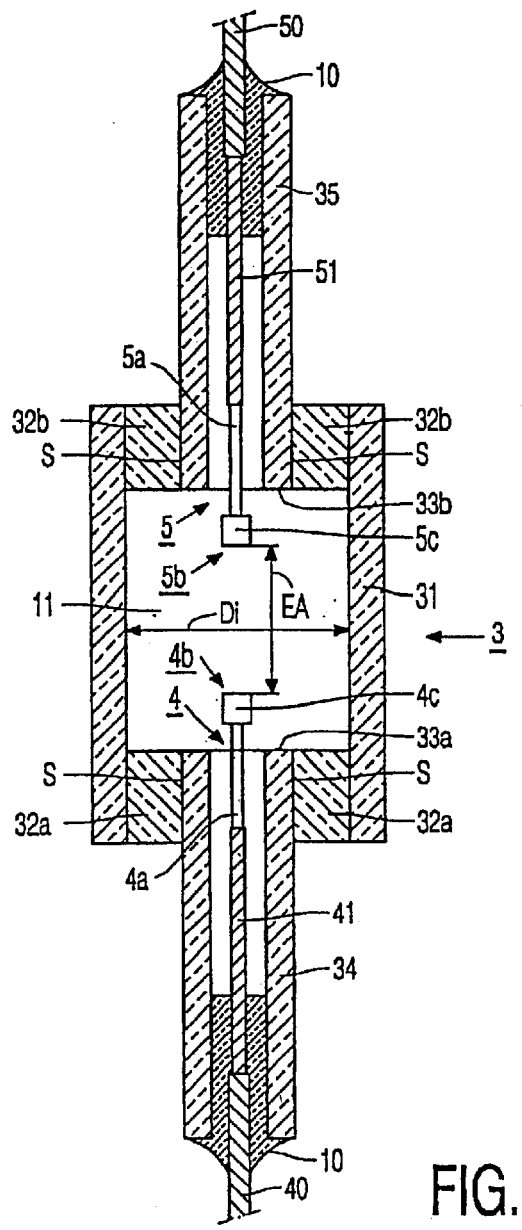
FIG. 4 is a cross-section of a discharge vessel of the lamp shown in FIG. 3.

It was noted that for long and thin ceramic HID lamp configurations of the type shown in FIGS. 3 and 4, when they were operated with a high frequency sweep between the $1^{st}$ azimuthal acoustic mode and the $1^{st}$ radial acoustic mode, arc straightening was present. But at VHF frequencies no evidence was found for arc straightening. Also, color mixing was most effective with long and thin lamps if arc straightening occurs at the same time that the $2^{nd}$ longitudinal acoustic mode is excited.

As noted above, in a preferred embodiment, the method of the present invention as represented in FIG. 1 utilizes an amplitude modulated VHF carrier, where the amplitude modulating waveform is the sum of two terms. The first term is a frequency sweep for arc straightening and the second term is a fixed frequency for exciting the $2^{nd}$ longitudinal acoustic mode.

Referring in more detail to the operation of the preferred embodiment shown in FIG. 1, in an experiment operating a 70 W cylindrical ceramic HID lamp (dimensions of 4 mm ID and 19 mm IL) in a stable manner at a VHF frequency and amplitude modulating the VHF carrier with the sum of a frequency sweep for arc straightening and a fixed frequency corresponding to the $2^{nd}$ longitudinal acoustic mode, simultaneous arc straightening and color mixing were obtained. Color mixing is apparent from changes in the color temperature in the lamp and also is indicated by an increase in lamp voltage due to the color mixing. Proper color mixing is also indicated by the formation of a condensate band in the vessel about one third the distance from the bottom of the vessel. For arc straightening, if the amplitude of the arc straightening frequency is decreased beyond a certain point, the arc will distort and shift toward the wall near the lower electrode. Unacceptable arc bending will result in additional heating of the ceramic wall and potentially, cracking of the arc tube.

Figure 5A:
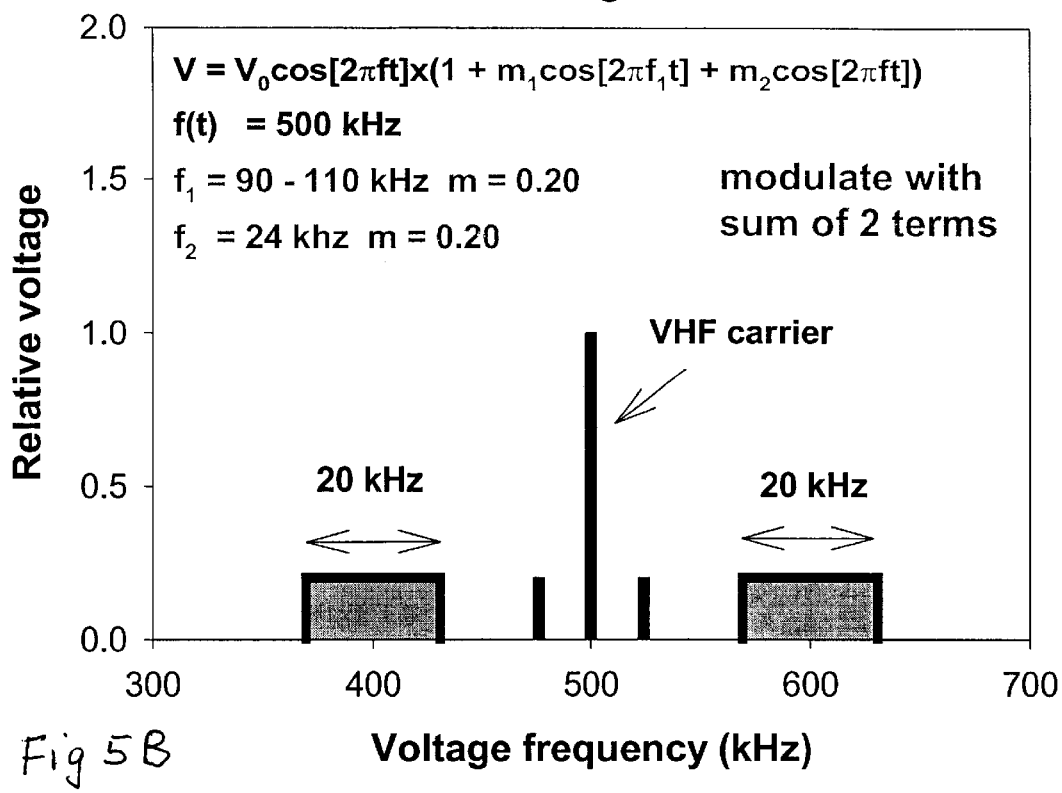
FIG. 5 is a graph of relative voltage v. voltage frequency for amplitude modulation of a VHF carrier frequency using the sum of a fixed frequency and a frequency sweep for arc straightening and color mixing.
FIG. 5B is a graph of the relative power v. power frequency for the amplitude modulation of FIG. 5A.
Figure 5B:
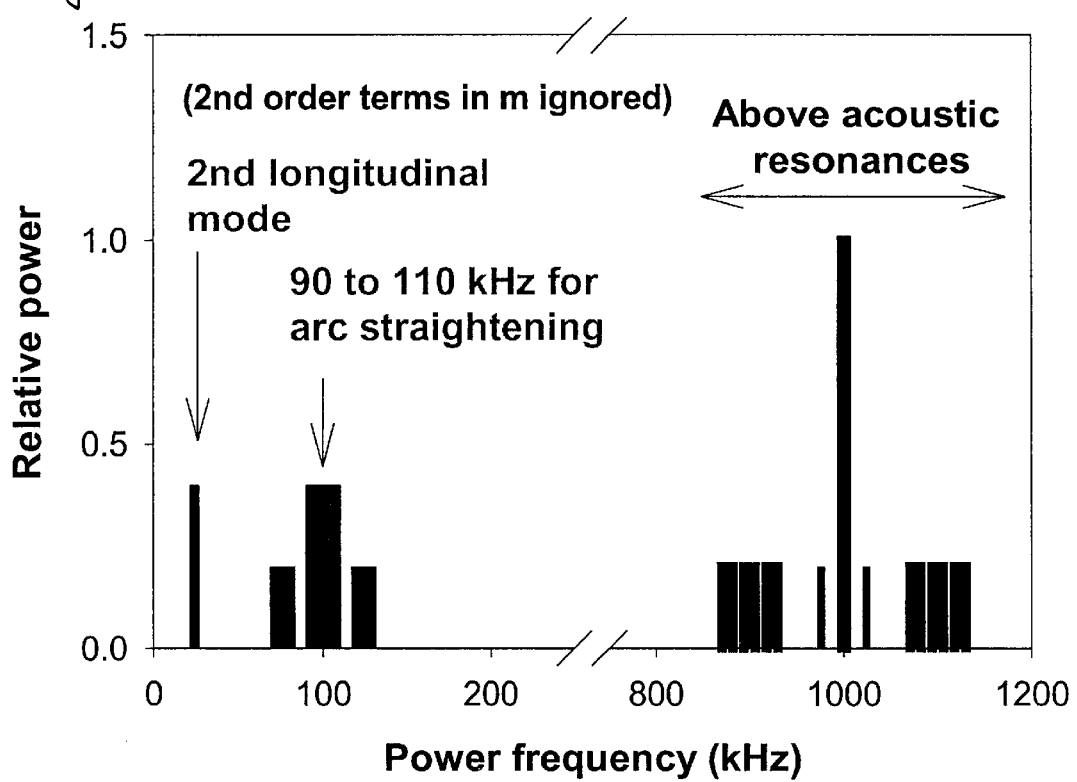

The amplitude modulating frequencies for this embodiment correspond to the lower frequencies required for arc straightening and color mixing (90 to 110 kHz and 24 kHz, respectively for the 70 W lamp). The voltage (or current) waveform is $\cos(2\pi f_1 t)^*[1+m_2 \cos(2\pi \Delta f_2 t)+m_3 \cos(2\pi f_3 t)]$, where $f_1$ is the VHF carrier frequency, $\Delta f_2$ is an amplitude modulating frequency sweep from 90 to 110 kHz with modulation index $m_2$ and $f_3$ is an amplitude modulating frequency at 24 kHz with modulation index $m_3$. The voltage (or current) spectrum is shown in FIG. 5A and comprises a carrier frequency with 4 sidebands at $f_1+/-\Delta f_2$ and $f_1+/-f_3$. This produces a power spectrum shown in FIG. 5B with frequency components at $2f_1$, $2f_1+/-\Delta f_2$, $2f_1+/-f_3$, $2f_1+/-(\Delta f_2+f_3)$, $2f_1+/-(\Delta f_2-f_3)$, $\Delta f_2$, $f_3$, and $\Delta f_2+/-f_3$ plus $2^{nd}$ order terms. The $\Delta f_2$ component from 90 to 110 kHz produces arc straightening and the $f_3$ component at 24 kHz produces color mixing. Although there are many additional power frequency components, most of them are centered on $2f_1$. These additional terms centered on $2f_1$ will not cause acoustic instabilities if one chooses a carrier frequency sufficiently high that damping and/or arc straightening stabilizes the discharge. In this example the carrier frequency was 500 kHz. The only low frequency power terms, other than those at $\Delta f_2$ and $f_3$ are at $\Delta f_2+/-f_3$. These low frequency sweep terms from 66 to 86 kHz and from 114 to 134 kHz, which are also present in the method described in U.S. Pat. No. 6,184,633, did not cause problems. The modulation indices $m_2$ and $m_3$ were both about 0.2.

The importance of simultaneous arc straightening and $2^{nd}$ longitudinal acoustic mode excitation was demonstrated in two ways. In the first example the 500 kHz carrier frequency was amplitude modulated at 24 kHz without the arc straightening term added ($m_2$=0). When the modulation index, $m_3$, became too high (>0.15) the arc shifted (bending) towards the wall near the lower electrode. In a second example, arc straightening and color mixing were simultaneously excited using the sum of these two terms at modulation indices of 0.2 each. The arc was straight and good color mixing was obtained, i.e., the color temperature of the lamp changed dramatically. When the modulation index $m_2$ was decreased to 0.15, which reduced the amount of arc straightening, the arc started to move away from the center of the arc tube.

The algorithm noted in the above referenced patent application was used to find the frequency of the $2^{nd}$ longitudinal acoustic mode. The 70 W lamp was then operated at 500 kHz and amplitude modulated with a frequency sweep from 90 to 110 kHz and $m_2$=0.2 for arc straightening. Fixed frequencies for exciting the $2^{nd}$ longitudinal acoustic mode from 27 kHz down to 21 kHz, in 100 Hz increments were added to the 90 to 110 kHz frequency sweep with $m_3$=0.05 and the lamp voltage was determined for each added frequency. At frequencies corresponding to color mixing the lamp voltage increased. After the frequency corresponding to the maximum voltage, $f_{max}$, was found, the frequency was decreased from 27 kHz down to $f_{max}$ and the modulation index increased. Good color mixing was achieved, i.e., the color temperature of the lamp decreased by about 1000 K.

In another experiment, a 200 W lamp with dimensions 8 mm ID×28 mm IL was operated at VHF in vertical base-up orientation. In the carrier frequency range from about 370 to 500 kHz many weak acoustic resonances were observed. Most of the instabilities were observed at the bottom electrode. A number of frequencies that appeared stable initially developed instabilities after many seconds or even minutes. Amplitude modulation with a frequency sweep from 40 to 50 kHz and $m_2 \approx 0.2$ stabilized the lamp at these VHF frequencies. These frequencies are expected to provide arc straightening. Amplitude modulation at 16 kHz, for excitation of the $2^{nd}$ longitudinal acoustic mode, without arc straightening caused the arc to distort towards the wall near the lower electrode. However, a stable discharge with a diffuse and broad condensate band ⅓ of the way up was achieved by amplitude modulating the carrier frequency with the sum of a frequency sweep from 40 to 50 kHz plus a fixed frequency at 16 kHz to excite the second longitudinal acoustic mode.

In another experiment demonstrating a second embodiment of the present invention, arc straightening and color mixing were also demonstrated in a 70 W lamp (4 mm ID and 19 mm IL) with a VHF carrier frequency using sum and difference frequencies. Referring to FIG. 2, a frequency sweep for the purpose of facilitating arc straightening is obtained from the function generator 200. This frequency sweep is then provided to the sum input of the function generator 202, which sums the frequency sweep with the fixed frequency directed to the vertical segregation problem. The resulting sum of the frequency sweep and the fixed frequency is then provided to the sum input of the function generator 204 for the carrier frequency. The output on line 205 is the sum of the carrier frequency, the frequency sweep and the fixed frequency. Sum and difference frequencies are obtained via a voltage waveform comprising the sum of the three frequencies, $f_1+\Delta f_2+f_3$, where $f_1$ is the VHF carrier frequency, $\Delta f_2$ is a frequency sweep and $f_3$ is a fixed frequency. The nine power frequencies are at $2f_1$, $2\Delta f_2$, $2f_3$, $f_1+\Delta f_2$, $f_1+f_3$, $\Delta f_2+f_3$, $f_1-\Delta f_2$ (or $\Delta f_2-f_1$), $f_1-f_3$ (or $f_3-f_1$), and $\Delta f_2-f_3$ (or $f_3-\Delta f_2$). By choosing $f_1-\Delta f_2$ (or $\Delta f_2-f_1$) equal to the arc straightening frequencies and $f_1-f_3$ (or $f_3-f_1$) equal to the $2^{nd}$ longitudinal mode frequency, arc straightening and color mixing can be obtained. As an example, when the VHF carrier frequency, $f_1$, was equal to 500 kHz and $\Delta f_2$ was a frequency sweep from 590 to 610 kHz and $f_3$ was about 524 kHz the power term $\Delta f_2-f_1$ was 90 to 110 kHz which produced arc straightening and the power term $f_3-f_1$ was at 24 kHz which produced color mixing. The power terms at $2f_1$, $2\Delta f_2$, $2f_3$, $f_1+\Delta f_2$, $f_1+f_3$, $\Delta f_2+f_3$ are at 1 MHz or higher, where damping and/or arc straightening stabilized the discharge. The power term at $\Delta f_2-f_1$ is a frequency sweep from 66 to 86 kHz, which caused no problems. Adjusting the amplitudes of $\Delta f_2$ and $f_3$ controls arc straightening and color mixing, respectively. Since color mixing depends on the difference between $f_3$ and $f_1$, tuning may be accomplished for color mixing by adjusting either $f_1$ or $f_3$ over a small frequency range.

Figure 6:
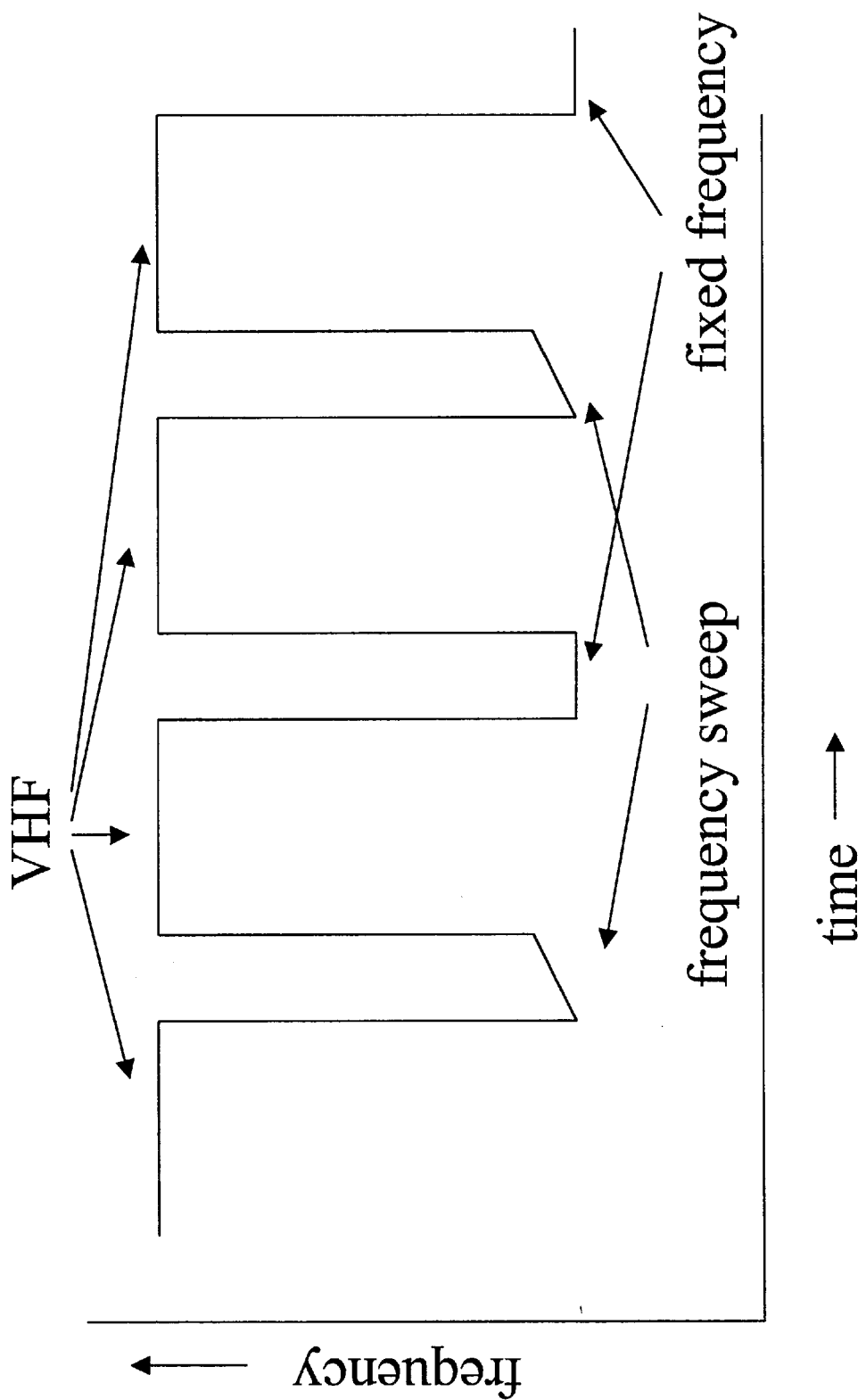
FIG. 6 is a frequency v. time graph of the time sequence of the carrier frequency alternating with a fixed frequency and a frequency sweep.

A third embodiment for implementing the present invention comprises a time sequential method wherein a current (and voltage) waveform is alternated among a carrier frequency at 500 kHz, a frequency sweep from 45 to 55 kHz for facilitating arc straightening and a fixed frequency at 12 kHz over a 10 ms period for addressing the problem of vertical segregation. The frequencies as a function of time are shown in FIG. 6. The ordering of the frequencies is not important. The different frequencies may be supplied by one or a plurality of function generators. In one embodiment, the frequency may be controlled using a voltage controlled oscillator input of a function generator and an appropriate voltage signal. In an experiment using this implementation, a power spectrum at 1 MHz, 90 to 110 kHz, and 24 kHz was produced. The amount of arc straightening was controlled by controlling the duration of the frequency sweep, while the amount of color mixing was controlled by controlling the duration of the fixed frequency. A typical sequence for the 10 ms period was 3.5 ms for the VHF carrier, 1.5 ms for the frequency sweep for producing the arc straightening, 3.5 ms for the VHF carrier, and 1.5 ms for the fixed frequency for the vertical segregation problem. Using this time sequential method color mixing was achieved with a condensate band at the ⅓ position.

Amplitude modulation of the VHF carrier frequency with the sum of two terms for simultaneous arc straightening and color mixing was the best of the three methods discussed.

It should be noted that the present invention is particularly applicable to lamps whose $2^{nd}$ longitudinal mode lies lower in frequency than the $1^{st}$ azimuthal mode.

It should also be noted that the carrier frequency chosen should be significantly higher than the fixed frequency used for the vertical segregation problem. The carrier frequency should be high enough that acoustic resonances are sufficiently damped after arc straightening so that the arc is stable.

Note finally that the control of the amplitude of the frequency sweep and/or the fixed frequency can be accomplished in a variety of well known ways, including by simply adjusting the manual or automatic amplitude control on the pertinent function generators.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined the claims appended hereto, and their equivalents.

What is claimed is:

1. A method to substantially overcome vertical segregation in HID lamps, comprising the steps of:
   determining and selecting a frequency sweep signal to produce arc straightening and a fixed frequency signal for exciting a second longitudinal acoustic mode; and
   exciting in conjunction with a carrier frequency an arc straightening acoustic mode together with a second longitudinal acoustic mode excitation.

2. The method as defined in claim 1, wherein the frequency that produces arc straightening is in a range above a first azimuthal acoustic mode and below a first radial acoustic mode for the resonance spectrum of the HID lamp.

3. The method as defined in claim 1, further comprising the step of choosing the carrier frequency signal sufficiently high in frequency so that in conjunction with the frequency sweep signal the arc is stable and color mixing is achieved.

4. The method as defined in claim 1, wherein the exciting step comprises amplitude modulating the carrier frequency signal with a sum of the frequency sweep signal and the fixed frequency signal.

5. The method as defined in claim 4, further comprising the step of controlling an amount of arc straightening by controlling an amplitude of the amplitude modulating frequency sweep signal.

6. The method as defined in claim 4, further comprising the step of controlling an amount of color mixing by controlling an amplitude of the fixed frequency signal.

7. The method as defined in claim 1, wherein the exciting step comprises the step of summing the carrier frequency signal with the frequency sweep signal and the fixed frequency signal to obtain difference power frequencies which excite the arc straightening acoustic mode and the second longitudinal acoustic mode.

8. The method as defined in claim 7, further comprising the step of controlling an amount of arc straightening by controlling an amplitude of the frequency sweep signal relative to the amplitude of the carrier frequency signal.

9. The method as defined in claim 7, further comprising the step of controlling an amount of color mixing by controlling an amplitude of the fixed frequency signal relative to the amplitude of the carrier frequency signal.

10. The method as defined in claim 1, wherein the exciting step comprises the step of alternating in time continuously the carrier frequency signal, the frequency sweep signal and the fixed frequency signal, in any order, with both the frequency sweep signal and the fixed frequency signal being at one half the power frequencies required for arc straightening and color mixing, respectively.

11. The method as defined in claim 10, further comprising the step of controlling an amount of arc straightening by controlling a duration of the frequency sweep signal relative to the duration of the carrier frequency signal.

12. The method as defined in claim 10, further comprising the step of controlling an amount of color mixing by controlling a duration of the fixed frequency signal relative to the duration of the carrier frequency signal.

13. The method as defined in claim 1, wherein the determining step comprises:

determining a resonance spectrum for the HID lamp;

selecting a frequency range for the frequency sweep signal to produce arc straightening that is above the first azimuthal acoustic mode for the HID lamp and below the first radial acoustic mode for the HID lamp and selecting a frequency for the fixed frequency signal to produce color mixing.

14. The method as defined in claim 1, wherein the HID lamp has a cylindrical symmetry.

15. The method as defined in claim 1, wherein the HID lamp has a discharge vessel with a ceramic wall.

16. An HID lamp with arc straightening, comprising:

a discharge vessel containing an ionizable filling; and a circuit for exciting in conjunction with a carrier frequency an arc straightening acoustic mode together with a second longitudinal acoustic mode in the discharge vessel, wherein the exciting circuit comprises:

a first component for generating a frequency sweep signal to produce arc straightening and a fixed frequency signal for exciting a second longitudinal acoustic mode and summing the frequency sweep signal and the fixed frequency signal; and a second component for combining the summed frequency sweep signal and the fixed frequency signal with a carrier frequency signal to excite the arc straightening acoustic mode together with the second longitudinal acoustic mode in the discharge vessel.

17. The HID lamp as defined in claim 16, wherein the frequency sweep that produces arc straightening is in a range above a first azimuthal acoustic mode and below a first radial acoustic mode for the resonance spectrum of the HID lamp.

18. The HID lamp as defined in claim 16, further comprising the second component providing a carrier frequency signal sufficiently high in frequency so that in conjunction with the frequency sweep signal the arc is stable and color mixing is achieved.

19. The HID lamp as defined in claim 16, wherein the second component for combining amplitude modulates the carrier frequency signal with the sum of the frequency sweep signal and the fixed frequency signal.

20. The HID lamp as defined in claim 19, wherein the first component controls an amount of arc straightening by controlling the amplitude of the amplitude modulating frequency sweep signal.

21. The HID lamp as defined in claim 19, wherein the first component controls an amount of color mixing by controlling an amplitude of the fixed frequency signal.

22. The HID lamp as defined in claim 16, wherein the second component for combining sums the carrier frequency signal with the frequency sweep signal and the fixed frequency signal to obtain difference power frequencies which excite the arc straightening acoustic mode and the second longitudinal acoustic mode.

23. The HID lamp as defined in claim 22, wherein the first component controls an amount of arc straightening by controlling an amplitude of the frequency sweep signal relative to the amplitude of the carrier frequency signal.

24. The HID lamp as defined in claim 22, wherein the first component controls an amount of color mixing by controlling an amplitude of the fixed frequency signal relative to the amplitude of the carrier frequency signal.

25. The HID lamp as defined in claim 16, wherein the second component for combining alternates in time continuously the carrier frequency signal, the frequency sweep signal and the fixed frequency signal, in any order, with both the frequency sweep signal and the fixed frequency signal being at one half the power frequencies required for arc straightening and color mixing, respectively.

26. The HID lamp as defined in claim 25, wherein the first component controls an amount of arc straightening by controlling a duration of the frequency sweep signal relative to a duration of the carrier frequency signal.

27. The HID lamp as defined in claim 25, wherein the first component controls an amount of color mixing by controlling a duration of the fixed frequency signal relative to a duration of the carrier frequency signal.

28. The HID lamp as defined in claim 16, wherein the HID lamp has a cylindrical symmetry.

29. The HID lamp as defined in claim 16, wherein the HID lamp has a discharge vessel with a ceramic wall.

* * * * *